Oct. 27, 1970     C. N. McCLURE     3,535,730
CAR CLEANING APPARATUS
Filed Dec. 4, 1967     2 Sheets-Sheet 1
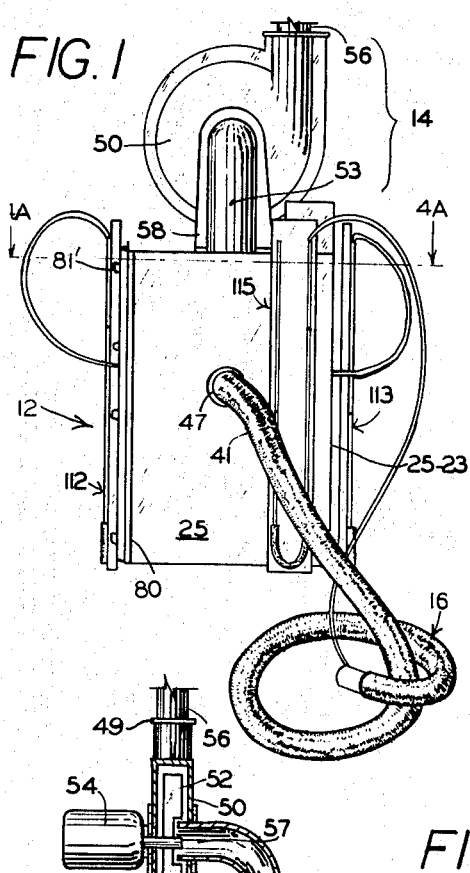
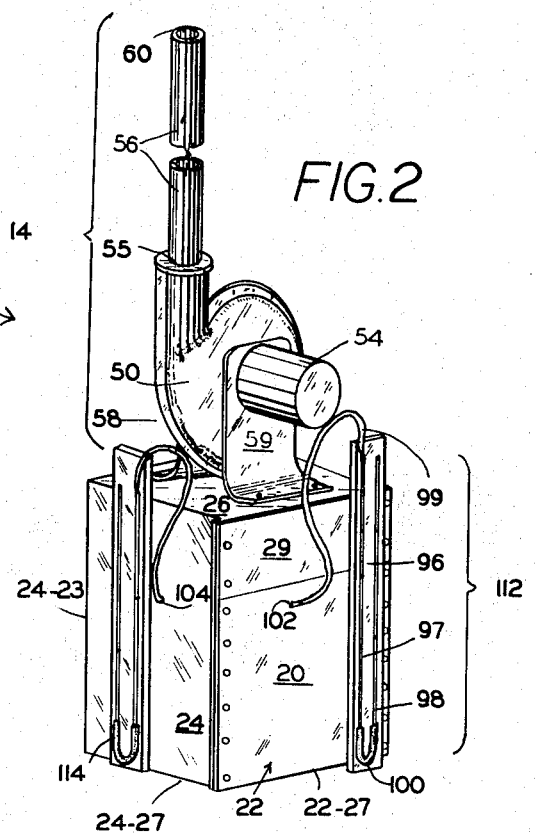
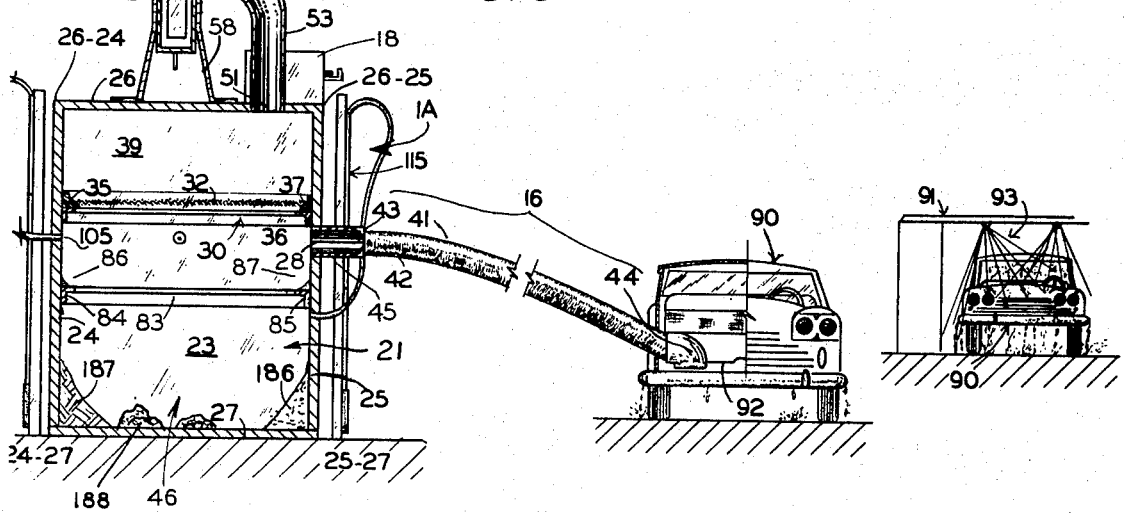
INVENTOR.
CLAUDE NEWTON McCLURE
BY
Ely Silverman
ATTORNEY Oct. 27, 1970     C. N. McCLURE     3,535,730

CAR CLEANING APPARATUS

Filed Dec. 4, 1967     2 Sheets-Sheet 2

INVENTOR.
CLAUDE NEWTON McCLURE
BY
Ely Silverman
ATTORNEY

United States Patent Office 3,535,730
Patented Oct. 27, 1970

3,535,730
CAR CLEANING APPARATUS
Claud Newton McClure, 431 Star St.,
Hereford, Tex. 79045
Filed Dec. 4, 1967, Ser. No. 687,593
Int. Cl. A47l 51/38
U.S. Cl. 15—314
1 Claim

ABSTRACT OF THE DISCLOSURE

A process of treating the interior of an automobile after such automobile has been subjected to a car wash, comprising steps of collecting and agglomerating the dust by a low pressure gaseous stream that carries the dust through a duct to a settling chamber, settling out the solid material in said settling chamber, then raising the pressure and temperature of the gas and discharging a substantially dust-free air stream into the atmosphere. The process is performed by an apparatus comprising a settling chamber having sharp vertical corners and a rectangular horizontal cross section, a hose entering the upper portion of one settling chamber wall at a right angle thereto, the settling chamber having a transverse cross section at least 100 times that of the hose, a large-apertured screen above the settling chamber, a plenum chamber above the screen, a fan above the plenum chamber, a discharge duct above the fan.

BACKGROUND OF THE INVENTION

Field of the invention

This invention relates to an improved fixed position cleaner and cleaning system with a sturdy dust and dirt separating and storing means with a minimum of maintenance requirements.

Description of the prior art

Prior art attempts at car cleaning used conventional vacuum cleaners, e.g. U.S. Pat. No. 2,570,307; such cleaners use replaceable filter elements which are so rapidly filled in commercial operation that the expense of frequent emptying and replacing such filter bags is uneconomical: additionally, labor for such tasks is under present labor conditions not available.

One problem of the prior art has been to remove dirt, from air without labor requirements of removing and replacing filter elements. Another problem has been to provide a dust-removing means that operates when the dust may be damp as in the vicinity of car wash operations; damp dust clogs filter elements particularly rapidly. Another problem has been to be able to conveniently inspect the material removed from automobile passenger compartment for valuable matters and recover same. Yet another problem has been to provide a sufficiently dust free discharge to satisfy urban air pollution concern.

SUMMARY OF THE INVENTION

This invention provides for agglomerating fine dust particles and separation thereof from a carrying air stream, prior to passing the air stream to a fan whereat the temperature of the air is raised. A sturdy non-clogging large aperture screen is located above the inlet to the separating chamber and prevents clogging of the fan thereabove by large air floatable objects yet does not substantially interfere with air flow therethrough.

Fine dust as well as larger objects are removed from the area cleaned for long periods of time and are kept available for inspection and ready discard without interim replacement of a filter element or emptying of the debris collector.

DESCRIPTION OF THE DRAWINGS

FIG. 1 is an end view taken along the direction of the arrow 1A of FIG. 3 showing a vacuum test on the hose mouth of an embodiment 10 of this invention.

FIG. 2 is a perspective view of one embodiment, 10, of the invention shown in FIG. 1.

FIG. 3 is a vertical sectional view taken generally along the vertical plane 3A—3A of FIG. 4 to expose the interior of the apparatus 10.

DESCRIPTION OF THE PREFERRED EMBODIMENTS

Figure 4:
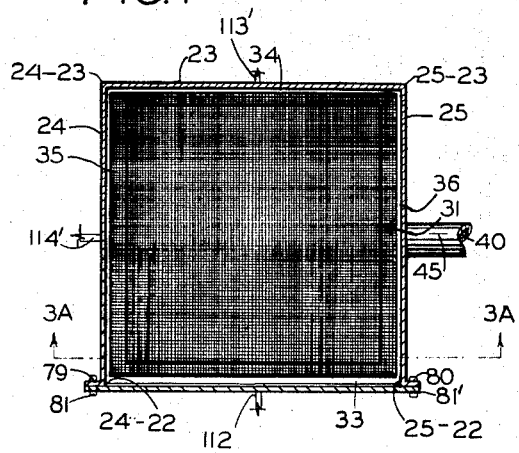
FIG. 4 is a horizontal sectional view taken along the horizontal plane 4A—4A of FIG. 1.

The apparatus 10 comprises in operative connection a separation chamber assembly 12, and a fan discharge assembly 14, and a hose assembly 16.

The separator assembly chamber 12 comprises a main chamber 21, and a screen assembly 30. The chamber 21 is formed by left wall 22, a right wall 23, a front wall 24, a rear wall 25, top wall 26 and a bottom wall 27. These walls are all flat and rigid and rectangular in outline and form a rigid square-cornered flat walled chamber. All of these walls are also imperforate except for passages therethrough for hose assembly 16 in wall 25, discharge assembly 14 in wall 26, and such measurement and control apparatuses as 112, 113, 114 and 115 below described. The walls 21–27 are firmly joined at their edges in airtight manner as by seam 24–22 between walls 24 and 22, by seams 26–24 between walls 26 and 24, seam 24–23 and seam 27–24. The other seams correspondingly are denoted by the numbers of the wall on either side of the seam and those reference numbers joined by a hyphen as in the above description of those particular seams. Except for the wall portion 20 of wall 22 these walls are all permanently as well as rigidly joined together.

The left vertical wall 22 is formed by an upper skirt portion 29 to which a removable portion 20 is operatively attached. The wall portion 20 is removably attached to the walls 24, 25 and 27 and as well as to the bottom of skirt portion 29.

The screen assembly 30 comprises a rigid hollow rectangular frame 31 and a screen 32. Screen 32 is firmly attached to the inner portions of the rectangular frame 31. For purposes of description the screen assembly 30 divides the interior chamber 21 into an upper plenum chamber 39, and a lower inlet chamber 46. Frame 31 comprises a four straight L's rigidly joined to each other at right angles at their ends. The outline of the frame fits closely yet slidably within the walls forming chamber 21 as shown in FIG. 4. The screen 32 is a metal screen such as is used in homes to prevent house flies from entering; more particularly screen 32 has 14 to 18 rectangular holes each linear inch and the wires of the screen are about .01 inch in diameter. It is joined firmly at its edges to the frame 31. A horizontal set of rigid screen support brackets 33, 34, 35 and 36 are firmly joined respectively to the walls 22, 23, 24, and 25; more particularly left support bracket 33, right support bracket 34, front support bracket 35 and rear support bracket 36 are respectively, joined to the left wall 22, right wall 22, right wall 23, front wall 24 and rear wall 25 of the chamber 21. Each bracket is straight along its length and L-shaped in transverse cross-section. Each bracket is firmly joined all along its length in air-tight manner to a wall and, with screen assembly 30 thereon, provides that air cannot pass from chamber 46 to portion 39 of the chamber 21 except through the screen 32.

The fan discharge assembly comprises a fan housing 50, which is firmly attached to the top wall 26, a fan 52 rotatably mounted in the housing, an electric motor 54 operatively connected to the fan and supported by rigid brackets as 58 and 59 firmly fixed to and extending above the wall 26. The housing 50 has a conventional discharge opening 55; a vertically extending discharge tube 56 is operatively attached to opening 55 and extends substantially above the opening 55. A firm airtight inlet conduit 53 extends from an outlet orifice 51 in the wall 26 at the top of chamber portion 39 to the inlet opening 57 of the fan housing 50.

The hose assembly 16 comprises a conduit body portion 41 which is a conventional cylindrical hose comprising a series of equally sized closely spaced, firm cylindrical rings as 42 with an outer air-tight surface 43 therebetween which is relatively flexible and provides that the interior 40 of the flexible hose is kept open at all times. The outlet end 45 of conduit 41 opens through a circular inlet orifice 28 in the wall 25 of the chamber 21; however, the cross-sectional area of the orifice 28 is the same as the transverse cross-sectional area of the interior 40 of the conduit 41. Conduit 41 is provided with a thin wide mouth 44 at its inlet end.

In embodiment 10 threaded vertically extending flanges 79 and 80 are attached to the outside faces of walls 24 and 25 respectively adjacent to the junction of these walls with wall portion 20. Threaded bolts press through the vertical edges of portion 29 and firmly attach plate portion 20 in an air tight but releasable manner to flanges 79 and 80. The wall 20 may accordingly be released and removed from the remainder of chamber 21 for inspection and removal of the contents thereof by removal of said threaded bolts as 81 and 81′.

Generally, apparatus 10 is a vacuum cleaner which is particularly adapted for use in a commercial establishment known as a car wash operation. In the conventional car wash operation 91, an automobile as 90 is treated, with its windows closed, by hot water or aqueous solutions, one or more of which contain soap or detergent. The temperature of these washing solutions is usually far in excess of 100° F., e.g. 120 to 140° F. The air in the passenger compartment, as 92 of an automobile as 90, passed through the car wash initially has a lower moisture content than corresponds to 95° F. and 50% relative humidity—usually about 60° to 80° F. and 50 to 15% humidity. However, in a car wash 91, the air enveloping the vehicle 90 in the immediate vicinity of the car being washed is usually substantially higher than that corresponding to 95° F. and 50% relative humidity. Such air enters the car passenger compartment 92 even though water does not and the moisture content in the air in that compartment rises. Such entry is through conventional heating and ventilating and air conditioning ducts in modern automobiles as well as by pressure escape means provided for pressure release when all windows are closed as well as by loose door seals. This is frequently indirectly observed by the "muggy" feeling in such cars after such washing and/or by the condensation of moisture on the interior surfaces of the windows of cars when they leave a car wash; such moisture is usually removed by attendants or the do-it-yourself operator.

Further, after washing of the exterior of the car, the interior glass is usually swabbed with a damp rag or towel, usually hot: this also adds moisture to the interior of the vehicle although the glass surface is dried with a dry water-absorbent cloth. The fine dust in the rug, roof liner and seats of the car absorb moisture. Also, the material that is treated by apparatus 10 includes material other than the usual small material removed in a domestic vacuum cleaning operation; much relatively large trash which is not usually found in a house or home is frequently met in an automobile for instance large ribbons, large pieces of paper as well as the usual dust, hair pins, and cigarette butts. Accordingly, notwithstanding the theory of operation herebelow given a hose of somewhat larger internal diameter than is conventionally used for cleaning purposes is used in this apparatus 10.

One result of processing an automobile, as 90 through a car wash operation as 91 is, accordingly, an increase humidification of the air within the vehicle.

In operation of apparatus 10, the suction by the fan 50 creates a very definite lowering of pressure at the mouth 44 (about 9±¼ inches of water relative vacuum, measured as below described) and a substantial air velocity (corresponding to the afore-mentioned relative vacuum) through the mouth 44 of the hose assembly 16. In such operation of apparatus 10 this flow of air from the compartment 92 of the vehicle 90 normally provides a temperature drop of several (5 to 10) degrees Fahrenheit of the air-solid suspension passing from the compartment 92 through the conduit interior 40, the exact amount depending on the moisture content of the air in compartment 92. Especially in view of the large amount and fine size of the dust present in the compartment 92, this drop of temperature causes condensation of the moisture in the air in the vehicle which is treated by this apparatus. The material (cooled air, litter and particulate matter) picked up from zone 92 travels through the hose body 41 at a relatively high velocity due to the suction created in the chamber 21 by the fan assembly 14. The relatively rapid rate of gas flow through the hose 41 minimizes heat transfer or temperature increase during the time of passage of that material from the mouth 44 of hose assembly 16 to the inlet orifice 28 to the chamber 21. Accordingly, the mass of air drawn from mouth 44 is relatively unchanged in temperature when it reaches the chamber 21 from what it was at the mouth 44 of the hose: this temperature at the mouth 44 of the hose 41 is however substantially lower than the temperature of the air within the vehicle as measured with a thermometer with a dry bulb. For practical purposes the passage through the assembly 16 provides for a thorough mixing of the moist air picked up from the interior of compartment 92 of the vehicle 90 with the fine dust carried by the assembly 16 from the mouth 44 to the orifice 28 by the turbulent motion thereof.

Within the chamber 21 the orifice 28 is located below the screen 32 and below the brackets supporting the frame 31. The terminal portion 45 of the hose assembly 16 is a rigid cylinder and its longitudinal axis is directed in a line perpendicular to the opposite wall 24, of the chamber 21. In the embodiment 10, the top face of the screen 32 is located one inch above the topmost portion of portion 45 and 27 inches above the bottom wall 27 of chamber 46. The dimensions of the chamber 46 are, as detailed in Table I, such that the velocity of the gaseous solid stream directed toward wall 24 is substantially zero at the time when the stream has traveled that far. This velocity change is due to a 200 fold increase in cross-sectional area of the chamber 46 (some 25″ x 27″) relative to the transverse cross sectional area of the orifice 28. ($\pi d^2/4 = 3.14$ sq. in.) This is shown in practice of the invention by that the pressure as measured at the wall 24 will be substantially the same at walls 22 and 23.

Additionally, the turbulence due to the straight-sided sharp-cornered walls provides for production of vortices that cause the solid material to settle in large portion as at 86 and 87 at the corners as 24–23 and 23–25 respectively as is observed on opening of the chamber by removal of the wall portion 20 for observation of and collection of the material collected on the bottom wall 27 prior to sweeping same out. The provision of the imperforate wall 27 allows for inspection of the material collected by this apparatus. This inspection is an economically important aspect, inasmuch as in automobiles there is frequently money on the floor of such cars, and not only coins but bills; unless this material is easily available to inspection (while the inspector is at some distance there-from so he is not too concerned about dust) these valuables will be discarded. In embodiment 10, angles 82, 83, 84 and 85 are provided on walls 22, 23, 24, and 25, respectively, below angles 32, 33, 34, and 35 at a level of 12 inches above floor 27. These angles are identical in size and shape to angles 32, 33, 34, 35 and 36.

In operation of the apparatus 10, dust of a size of —800 mesh is collected at a level, as at 86 and 87, 12 inches above floor 27, as well as at 186 and 187 on floor 87 in corners 24–27 and 25–27, and a substantial volume of solids may be collected in chamber 46 without requiring that chamber to be emptied; more particularly, an average depth of 3 inches of solid may be accumulated on bottom wall 27, or, economically expressed, approximately 300 cars may be cleaned by apparatus 10 without requiring emptying thereof. This is the usual capacity for a usual three days' commercial operation. However, it is usual for the apparatus 10, while performing satisfactorily, to be emptied only once a week. The top surface of the screen 32 is smooth and has a dull metal brightness at the end of such period of operation; i.e., there is no accumulation of dust on the top of the screen wires nor at the reentrant angle portions where the wires of the screen cross over one another.

A feature of the operation of apparatus 10 is that the screen 32 need not be frequently replaced or even be regularly cleaned inasmuch as the separation of the solid debris from the gaseous stream carrying it into the chamber 46 is effected by the dimensional characteristics of the apparatus rather than the mechanical sizing operation of the screen 32. The apertures of screen 32 occupy $$\left[\frac{.054 \times .0396}{(.954+.008)(.0396+.008)}\right] = 73\%$$

of the total cross-sectional area of that screen. The screen 32 operates substantially only to avoid carrying into the fan readily air-floatable material which is large in area relative to the thickness thereof such as dollar bills, paper. The gaseous material which does rise through the apertures from the chamber is substantially dust-free and dust being particles less than 200 mesh, as well as coarse particles and comes into the chamber 46 at a temperature below the dry bulb temperature of the air at zone 92. Orifice 51 is a circular orifice of 4" O.D. located half-way between walls 22 and 23 and with its center 6 inches from wall 25. The velocity therethrough is only ¼ of the velocity through orifice 28.

In the fan housing 52, because of the turbulence there developed, a substantial heating effect results and is intensified by the passage of such compressed air through the long tube 56. This is not, mechanically, a completely efficient fan and discharge system, but it does serve to raise the temperature of the air, which drives off the water from any remaining agglomerates of dust, agitates the particles, breaks them up and disperses this discharged gaseous stream at a sufficiently great height that they will not settle in the vicinity, if at all. As a matter of fact, because of the extreme fineness of the solids in the discharge, none can be found on a handkerchief placed over the discharge opening 60 of the discharge tube 56.

In its preferred embodiment the dimension of apparatus 10 are as given in Table I herebelow.

TABLE I

Chamber 21, (outside dimensions): Height (edge 24/27 to edge 24/26) 38", width (edge 23/24 to edge 20/24) 25", length (edge 23/24 to edge 25/23) 25"
Frame bracket 33: Width ¾", (outside dimensions— Length x width 24" x 24")
Screen 32: Holes per inch 14 x 18, hole width .05" (.054), hole length .04" (.0396), wire size/diameter .01" (.0083), height above floor 27 27"
Hose: Length 12 ft., inside diameter 2", outside diameter 2½"
Mouth: Width x height 3" x ½"
Pipe 56: Height 3' 7", inside diameter 2"
Fan 50: Outside diameter 12", width 2"
Motor 54: r.p.m 3450, horsepower ¾, 115 volt 3 amps The inlet chamber 46 is substantially a cube; length, width and height all being 26±1". The output of motor 54 and fan 50 is 1,000 c.f.m. at usual operation, approximately.

In a particular illustrative embodiment of operation of the apparatus 10, the temperatures below described are measured by one of a series of like conventional Springfield Thermometer Company, No. 096 model thermometer having a range from —40° F. to +120° F., with a 7 inch long stem, the stem being graduated in intervals of 2° F., each interval being 0.69 inch wide (whereby readings are accurate to ±1° F.), the stem being 3/16" O.D. and about 1/16 inch I.D. with red colored liquid. One such thermometer was left at each point measured and all temperature readings were taken in two minutes. The pressures were measured by U-tube assemblies 112, 113, 114, 115 each of which is like the other, hence a description of one (112) describes the structure of the others. U-tube assembly 112 comprises a tubing support 96, a vertical cylindrical glass input tube 97, and a vertical cylindrical glass control tube 98, and a connection element 99. Arm 97 and arm 98 are each formed by 36" long ¼" O.D., 3/16" I.D. glass tubing, their tops being at the same height. The top of arm 98 is open to the atmosphere. One end of a flexible piece of 3/16" I.D., 3/8" O.D. rubber tubing is attached to the top of tube 97; the other end of the rubber tubing 101 is operatively connected to the point at which the pressure is measured, e.g., a normally plugged hole 104 through wall 24, whereby pressure readings are accurate to ±¼ inch.

The bottom of arm 97 and bottom of arm 98 are joined by a rubber tubing 100. Arm 97, arm 98 and tubing 100 are supported on support 96 which is a sturdy wooden board about 6 inches wide. As shown in FIG. 1 the tubing of assembly 115 corresponding to the measuring tubing 101 of assembly 112 is used to measure the vacuum in mouth 44.

In operation of apparatus 10, the mouth 44 of the hose assembly 16 is placed in the passenger compartment 92 of a vehicle 91 which has just exited from a car wash 91 within which car wash a stream of hot water 93 had been played on the outside of the vehicle, and the passenger compartment of which vehicle thereby has a high humidity, i.e. corresponding to 90% to 100% saturated at about 95° F. The temperature of the water used to form the car washing sprays, as 93, ranges between 110 and 120° F. (Where the temperature of the water used is higher, i.e. about 140° F. to 180° F. the degree of humidification of the air in the vehicle would be higher.) The outside air temperature is measured as 82° F., about 30% R.H.

The mouth 44 is played over the surfaces interior of the vehicle such as the floor and seats and crevices adjacent thereto to pick up debris thereon and therein. When the mouth is so placed in the vehicle and the switch for fan motor 54 is turned on within about 20 seconds there is pressure drop within the chamber 21 relative to the outside of about 9" of water and the dry bulb temperature drops substantially, i.e. to 73°–74° F. in the immediate vicinity of mouth 44 (as measured by a thermometer as above described and placed with its bulb in the opening of mouth 44, and temperature read after about 5 minutes of operation of the apparatus 10). The temperature of the gaseous stream in the tube 41 is substantially lower than the dry bulb temperature of the environment 92. There is some condensation of water on the dust and it is difficult to tell whether the dust helps the condensation or the condensation of the air helps the clumping of the dust particles. The dust then passes through the conduit 40 of the assembly 16 through the orifice 28 of wall 25 and is substantially slowed down by its passage thereafter because of the large increase in the cross-sectional area of the chamber 21 relative to the relatively small cross-sectional area of tube 40.

For purpose of demonstration as well as control and calibration of apparatus 10, test holes 102, 103, 104 and 105 are located in walls 22, 23, 24, and 25 respectively and each test hole is connected to an input arm as 97 of a U-tube assembly as 112, 113, 114 and 115 for walls 22, 23, 24, and 25 respectively. During operation of the apparatus 10 the pressures measured at holes in walls 22, 23, 24, and 25 were as shown in Table II. Holes 102, 103, 104 and 105 are cylindrical and perpendicular to the walls in which located.

TABLE II

| Point | Negative pressure in inches of water (±¼″) | |
|---|---|---|
| | During operation | Maximum [1] |
| 102 | 6⅞ | 9⅞ |
| 103 | 7 | |
| 104 | 7⅛ | 9¼ |
| 105 | 6¾ | 9¾ |

[1] On closure of mouth 44.

A throttle 49 in the tube 56 serves to lower the vacuum in the chamber 21 as needed so that measured pressure at points 102, 103, 104 and 105, which holes are in at the same horizontal plane as the axis of the cylindrical cover portion 47 are substantially the same, i.e. there is no selective impact pressure against the wall 24; to the contrary pressure being the same at walls 23, 24, and 25, it appears that there is a substantially total loss of velocity of the gaseous stream in the direction of the central longitudinal axis of the terminal or outlet portion 45 of conduit 41 by the time any one portion of such stream is in the neighborhood of wall 24. There is, on opening the wall 20 an observed accumulation of finely divided dust at 187 the corner 20–24–27 of chamber 46 (i.e., at the interior junction of walls 20, 24, and 27) and at 186 (the junction of walls 23, 25 and 27). These accumulations are about the same in size, i.e., 6 inches high with an angle of repose of about 45°, indicating the vortices developed in chamber 46 are equidistant from corners 23–25–27 and 20–24–27. The dust is not smoothly distributed over the walls 23, 24, 25, and 26, but is in rough nodular accumulations on the floor 27 and the walls are free of any continuous or thick accumulations of dust. Thermometers as above described placed in chamber 46 of apparatus 10 gave readings of 78° F. and a thermometer in the discharge opening 60 of tube 56 gave a reading of 84° F. Thermometers were placed as in Table III.

TABLE III

Location of thermometers:         Readings, degrees (1) Parallel to wall 24, top of screen 32, 2″ from wall 24, bulb halfway between walls 23 and 22 _ 78
(2) Parallel to wall 25, top of screen 32, 2″ from wall 25, bulb halfway between walls 23 and 22 _ 78
(3) Hanging from screen 32, bulb 6″ from wall 24, halfway between walls 23 and 22, 10″ below level of screen 32 _____ 77

The pressure is maintained in the chamber 46 so that the pressures at walls 23, 24 and 25 are the same to avoid any unnecessary turbulence in the chamber as such would not improve the separation and such might cause temperature effects which vitiate the effect of the location of the fan in this assembly.

The dust thus settled from the gaseous suspension in the chamber 46 and the solids collected in the corners 24–23, 23–25, 25–20, and 20–24 fall to the floor 27 from which they are subsequently removed. The dust is substantially completely removed by this action from the air stream in conduit 41 which air stream carried it to chamber 46 from compartment 92. Larger pieces of debris, as paper 188, accumulate randomly on bottom wall 27.

The air which rises through the screen 32 is quite dust free to sight and taste. The size of the dust collected on the vertical walls of chamber 21 is less than 20μ diameter and there is very little of that. It may be picked up on the finger but is not a visible accumulation. The air passes through the inlet conduit 53 to the inlet 57 of the fan housing 50, is agitated by and heated by the fan 50 within the housing, and passes out of the discharge opening 55 of housing 50 into the tubing 56. The tubing 56 being some 4 feet high and quite narrow causes quite a lot of turbulence and increase of temperature of air passing therethrough so that the suspension passed out through the opening 60 is a gas of considerably increased temperature (e.g. 84° F.) over the dry bulb temperature (74° F.) of the material initially entering into conduit 41; the solid particulate material discharged at 60 is not only finely divided but dry and not caught on a handkerchief. Thus, it is not observable by human sight. So far as smell is concerned the discharge is substantially free of dust. As above described, the process and apparatus obviates necessity of replaceable filters to effect a clean gaseous discharge from the apparatus and also substantial collection of the dust removed from the vehicle.

The dust particles accumulated in chamber 46, as at 186, 187, 86 and 87 are predominantly, in the sense of numbers of such particles, smaller than .02 mm. in size as observed at 400 magnification, i.e. average size is less than 20μ

A conventional coin operated switch and timer assembly 18 is supported on, and firmly fixed to, the top of assembly 12. A 110 volt A.C. power line 19 is operatively connected to motor 54 in conventional manner through that switch and timer assembly. The assembly 18 is set for a five minute operation on deposit therein of a ten cent piece.

In another embodiment of invention according to this invention, apparatus 61 comprises a separator chamber assembly 62, which corresponds generally to assembly 12 of embodiment 102, a fan discharge assembly 14′ which is identical to the fan discharge assembly 14 above described and a hose assembly 16′ identical to the hose assembly 16 above described.

Figure 6:
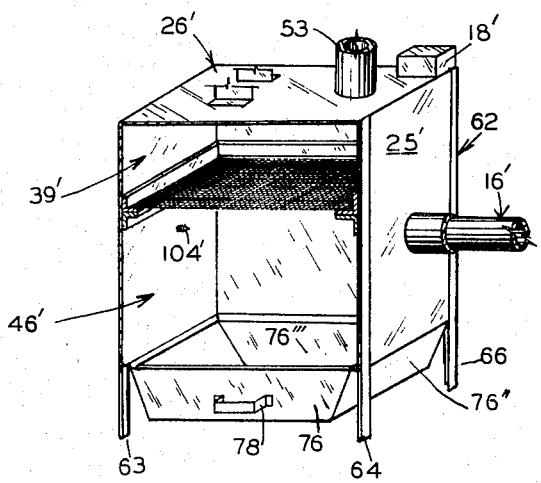
FIG. 6 is a perspective view of embodiment 61 broken away along the flat vertical plane indicated by intersecting straight lines 67–68 and 68–69 of FIG. 5 to show the interior of the apparatus 61.
Figure 5:
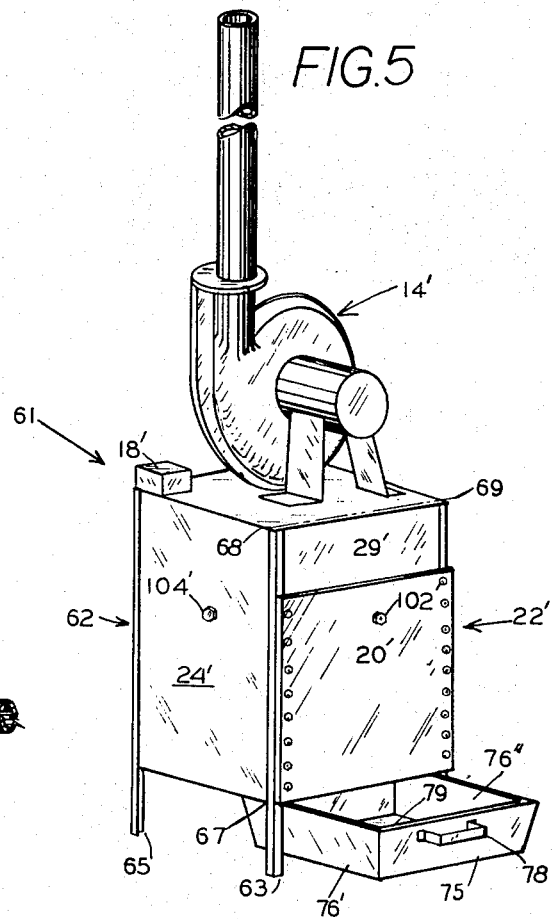
FIG. 5 is a perspective view of another embodiment, 61, of the invention.

In embodiment 61 a slidable basket 75 is used in lieu of the bottom wall 27 of chamber 12 as a bottom closure member of the inlet, settling, chamber 46′ and legs 63, 64, 65, 66 are firmly fixed to the outside corners of chamber 62 to provide the spacing needed below chamber 46′ for sliding the basket 75 from the operative airtight position thereof with chamber 46′, which position is shown in FIG. 6 to the discharge position shown in FIG. 5. Otherwise the embodiment 61 is identical to embodiment 10 and, except as above described, embodiment 61 is identical to embodiment 10. The elements and units in embodiment 61 similar to and corresponding to units above described for apparatus 10 are shown or referred to by the same reference numerals as used for embodiment 10, except for that the prime (′) superscript is used for the elements of apparatus 61.

As in apparatus 10 the left wall 22′ is formed of an upper skirt 29′ and a lower removable portion 20′ and, as shown for embodiment 10 the lower edge of the skirt does not reach as far down as the top of the screen assembly 30′, which permits for ready installation and access to that assembly.

The basket 75 has imperforate side walls as 76, 76′, 76″ and 76′″, flat bottom 79 and handle 78. The top edges of walls 76, 76′, 76″ and 76′″ form an airtight fit with the walls of chamber 46′ and permit ready removal of debris collected at the bottom of chamber 46′.

Although in accordance with the provision of the patent statutes, particular preferred embodiments of this invention have been described and the principles of the invention have been described in the best mode in which it is now contemplated applying such principles, it will be understood that the operations and constructions shown and described are merely illustrative and that the invention is not limited thereto and, accordingly, alterations and modifications which readily suggest themselves to persons skilled in the art without departing from the true spirit of the disclosure hereinabove are intended to be included in the scope of the annexed claim.

I claim:

1. In a commercial establishment known as a car wash operation apparatus comprising a hose, an inlet, an inlet chamber a screen, a plenum chamber, an air moving means, a discharge duct, (a) said inlet chamber being a chamber closed at its sides and bottom and comprising flat vertical walls joined to each other along vertical lines, a solid angle formed between the walls on either side of said vertical lines, (b) an inlet orifice in one of said flat vertical walls, said hose being operatively connected to said orifice and the longitudinal axis of said hose being directed at right angles to said wall, (c) said plenum chamber comprising a chamber closed at its sides and top and joined at its sides to the sides of the inlet chamber, said plenum chamber having a top wall, an orifice therein operatively connected to said air moving means, a horizontal screen, (d) said screen extending horizontally at the bottom of said plenum chamber and at the top of said inlet chamber, said screen having apertures therein, the apertures occupying the major portion of the total cross-section of the screen, (e) the vertical and horizontal cross section of said settling chamber at the level of said orifice each being at least 100 times the cross sectional area of the transverse cross-sectional area of said hose, (f) a discharge duct connected to the outlet of said air moving means, and (g) power means connected to said air moving means, and (h) wherein the shape of the said inlet chamber is substantially a cube, the inlet hose enters in the middle of one vertical wall with the top of the inlet orifice within one inch of the bottom of the screen supports, (i) the orifice in the plenum chamber has a transverse cross section greater than the transverse cross-sectional area of the inlet orifice and a central longitudinal axis located in the same vertical plane as the central longitudinal axis of the hose to the inlet chamber and is at right angles thereto, and said central longitudinal axis of said orifice is located closer to the wall in which the inlet orifice is located than to the inlet chamber wall opposite thereto, (j) wherein, in addition to the above, said walls of said inlet chamber each have orifices for connection to pressure indicating means, and a pressure indicating means is operatively attached to each said orifice and a throttle means is provided between said plenum chamber and said air moving means.

References Cited

UNITED STATES PATENTS

| | | | |
|---|---|---|---|
| 1,053,155 | 2/1913 | Campbell et al. | 55—467 XR |
| 1,316,442 | 9/1919 | Goughnour | 15—327 |
| 1,787,646 | 1/1931 | Smith | 15—327 |
| 1,934,494 | 11/1933 | Gillespie | 134—123 XR |
| 2,044,827 | 6/1936 | Adams. | |
| 2,534,808 | 12/1950 | Bevington et al. | 15—353 XR |
| 2,778,563 | 1/1957 | Doyle. | |
| 3,381,327 | 5/1968 | Kelley | 15—314 |

MORRIS O. WOLK, Primary Examiner

J. T. ZATARGA, Assistant Examiner

U.S. Cl. X.R.

15—339; 134—21